(12) United States Patent
Nanda et al.

(10) Patent No.: US 10,392,975 B2
(45) Date of Patent: Aug. 27, 2019

(54) EXHAUST GAS DIFFUSER WITH MAIN STRUTS AND SMALL STRUTS

(71) Applicant: General Electric Company, Schenectady, NY (US)

(72) Inventors: Deepesh D. Nanda, Bangalore (IN); Santhosh Kumar Vijayan, Bangalore (IN); Chengappa Manjunath, Bangalore (IN); Tomasz Jendrzejewski, Warsaw (PL)

(73) Assignee: General Electric Company, Schenectady, NY (US)

( * ) Notice: Subject to any disclaimer, the term of this patent is extended or adjusted under 35 U.S.C. 154(b) by 396 days.

(21) Appl. No.: 15/127,355

(22) PCT Filed: Mar. 18, 2014

(86) PCT No.: PCT/PL2014/000024
§ 371 (c)(1),
(2) Date: Sep. 19, 2016

(87) PCT Pub. No.: WO2015/142200
PCT Pub. Date: Sep. 24, 2015

(65) Prior Publication Data
US 2017/0130610 A1    May 11, 2017

(51) Int. Cl.
*F02C 7/12*    (2006.01)
*F01D 25/30*    (2006.01)
(Continued)

(52) U.S. Cl.
CPC ............ *F01D 25/30* (2013.01); *F01D 5/145* (2013.01); *F01D 5/146* (2013.01); *F01D 9/041* (2013.01);
(Continued)

(58) Field of Classification Search
CPC .......... F01D 25/24; F01D 25/28; F01D 25/30; F01D 5/145; F01D 5/146; F01D 9/041; F02C 3/04; Y02T 50/673
See application file for complete search history.

(56) References Cited

U.S. PATENT DOCUMENTS 2,844,001 A    7/1958 Alford
2,938,336 A    5/1960 Peterson
(Continued)

FOREIGN PATENT DOCUMENTS

CN    102628596 A    8/2012
CN    102844527 A    12/2012
(Continued)

OTHER PUBLICATIONS

International Search Report cited in PCT/PL2014/000024, dated Jan. 26, 2015, three pages.
(Continued)

*Primary Examiner* — Jesse S Bogue
(74) *Attorney, Agent, or Firm* — Nixon & Vanderhye P.C.

(57) ABSTRACT

An exhaust gas diffuser (38) including: a radially-outer peripheral casing (46); a hub (42) located within said radially-outer peripheral casing and coaxial with a center axis (40) of the casing; main struts (44) located at circumferentially-spaced locations about the hub and extending radially-outwardly to the radially outer peripheral casing; and small struts (52) located at circumferentially-spaced locations between the main struts; wherein the main struts and small struts have substantially parallel longitudinal chord lines and each of the small struts have a cross-sectional area smaller than a cross-sectional area of the main struts. An exhaust gas diffuser including: a radially-outer peripheral casing; a hub located within said radially-outer peripheral casing and coaxial with a center axis of the casing; main struts located at circumferentially-spaced loca-
(Continued)

tions about the hub and extending radially-outwardly to the radially outer peripheral casing; and small struts located at circumferentially-spaced locations between the main struts; wherein the main struts and small struts have substantially parallel longitudinal chord lines and each of the small struts have a cross-sectional area smaller than a cross-sectional area of the main struts.

21 Claims, 6 Drawing Sheets

(51) Int. Cl.
    *F01D 5/14*     (2006.01)
    *F01D 9/04*     (2006.01)
    *F01D 25/24*     (2006.01)
    *F01D 25/28*     (2006.01)
    *F02C 3/04*     (2006.01)

(52) U.S. Cl.
    CPC .............. *F01D 25/24* (2013.01); *F01D 25/28* (2013.01); *F02C 3/04* (2013.01); *Y02T 50/673* (2013.01)

(56) References Cited

U.S. PATENT DOCUMENTS

| | | |
|---|---|---|
| 2,941,781 A | 6/1960 | Boyum |
| 3,861,826 A | 1/1975 | Dean, Jr. |
| 4,023,350 A | 5/1977 | Hovan et al. |
| 4,354,802 A | 10/1982 | Nishida et al. |
| 4,877,373 A | 10/1989 | Bandukwalla |
| 5,152,661 A | 10/1992 | Sheets |
| 6,866,479 B2 * | 3/2005 | Ishizaka .................. F01D 25/30 |
| | | 415/209.1 |
| 7,717,229 B2 | 5/2010 | Putnam |
| 9,032,721 B2 * | 5/2015 | Orosa .................... F01D 25/305 |
| | | 60/395 |
| 9,422,864 B2 * | 8/2016 | Sakekar ..................... F02C 7/00 |
| 10,006,309 B2 * | 6/2018 | Hofmann ................. F01D 25/30 |
| 2004/0228726 A1 * | 11/2004 | Ishizaka .................. F01D 5/142 |
| | | 415/211.2 |
| 2005/0172607 A1 * | 8/2005 | Ishizaka .................. F01D 5/142 |
| | | 60/39.5 |
| 2008/0121301 A1 | 5/2008 | Norris |
| 2010/0158684 A1 * | 6/2010 | Baralon .................. F01D 5/146 |
| | | 415/208.1 |
| 2013/0098039 A1 * | 4/2013 | Orosa ..................... F01D 25/30 |
| | | 60/697 |
| 2013/0170969 A1 | 7/2013 | Subramaniyan et al. |
| 2014/0314549 A1 * | 10/2014 | Pakkala .................... F01D 9/02 |
| | | 415/148 |
| 2017/0335860 A1 * | 11/2017 | Voytovych ................ F02C 3/04 |

FOREIGN PATENT DOCUMENTS

| | | |
|---|---|---|
| EP | 2 584 155 | 4/2013 |
| JP | 2009-215897 | 9/2009 |

OTHER PUBLICATIONS

Machine translation and Notification of Reasons for Refusal issued in connection with corresponding JP Application No. 2016-557144 dated Feb. 20, 2018.

First Office Action and Search issued in connection with corresponding CN Application No. 201480077188.8 dated Feb. 28, 2017.

* cited by examiner

EXHAUST GAS DIFFUSER WITH MAIN STRUTS AND SMALL STRUTS

RELATED APPLICATION

This application is the U.S. national phase of International Application No. PCT/PL2014/000024 filed Mar. 18, 2014, the entire content of this international application is incorporated by reference.

BACKGROUND OF THE INVENTION

This invention relates generally to gas turbine engines, and more specifically to gas turbine exhaust gas ducts or diffusers.

Gas turbine engines and the like typically include an exhaust duct or diffuser downstream of the last stage of the turbine section. Generally described, the diffuser converts the kinetic energy of the hot flow gases exiting the last turbine stage into potential energy in the form of increased static pressure. The diffuser directs the hot flow gases through a casing of increasing area in the direction of flow. The diffuser generally includes a number of struts mounted onto a hub and extending radially to an outer casing, but other configurations are also known. Oftentimes, the struts will have an airfoil configuration.

During partial load operations, a last stage bucket exit tangential flow angle (swirl) may increase and may lead to flow separation on the struts and the hub of the diffuser. Flow separation and an increase in swirl, in turn, may reduce the diffuser static pressure recovery. More specifically, flow separation at part-load occurs almost uniformly from the center hub to the tips of the airfoil-shaped struts on their respective suction sides. Such a reduction in static pressure recovery may have an impact on overall gas turbine engine performance and efficiency.

It is also known to provide a number of smaller struts or vanes extending from the hub, such that the smaller struts alternate circumferentially with the main struts, such as shown in U.S. Published Patent Application 2013/0170969.

Traditionally, the smaller struts, which may also be airfoil-shaped, have been positioned at an angle to the main struts, but this configuration does not provide an optimum part-load operating condition. Thus, even with the utilization of the smaller struts/airfoils, an undesirable wake and separation pattern remains.

It would therefore be desirable to provide an exhaust gas diffuser that provides the desired part-load performance without otherwise incurring a diffuser and/or turbine performance penalties under other operating conditions.

BRIEF SUMMARY OF THE INVENTION

In accordance with a first exemplary but non-limiting embodiment, the invention relates to an exhaust gas diffuser comprising a radially-outer peripheral casing; a hub located within the radially-outer peripheral casing and coaxial with a center axis of the diffuser; a first plurality of relatively-larger struts located at circumferentially-spaced locations about the hub and extending radially-outwardly to the radially outer peripheral casing; and a second plurality of relatively-smaller struts located at circumferentially-spaced locations between the first plurality of relatively-larger struts; wherein the first plurality of relatively-larger struts and the second plurality of relatively-smaller struts have substantially parallel longitudinal center axes or chord lines.

In another aspect, the invention provides an exhaust gas diffuser comprising an outer casing; a hub centered within the outer casing; a plurality of airfoil-shaped struts extending from the hub to the outer casing in a circumferentially-spaced array; a plurality of auxifoils located circumferentially between the plurality of struts, the plurality of auxifoils each located closer to a suction side of one of an adjacent pair of airfoil-shaped struts; the plurality of auxifoils having center axes parallel to corresponding chord lines extending between leading and trailing edges of the plurality of struts.

In still another aspect, the invention relates to an industrial gas turbine comprising a compressor, a combustor, one or more turbine stages and an exhaust duct arranged along a turbine rotor axis, the exhaust duct incorporating a diffuser having a radially-outer peripheral casing; a center body or hub located within the radially-outer peripheral casing; a first plurality of relatively-larger struts located at circumferentially-spaced locations about the center body or hub and extending radially-outwardly to an outer peripheral casing; and a second plurality of relatively-smaller struts located at circumferentially-spaced locations between the first plurality of relatively-larger struts; wherein the first plurality of relatively-larger struts and the second plurality of relatively-smaller struts have longitudinal center axes substantially parallel to the turbine rotor axis; and wherein a circumferential space between each of the relatively-smaller struts and the closer of two adjacent relatively-larger struts, as measured from a chord line of the relatively-larger strut and a center axis of the relatively-smaller strut, does not exceed ten inches.

DETAILED DESCRIPTION OF THE INVENTION

Figure 1:
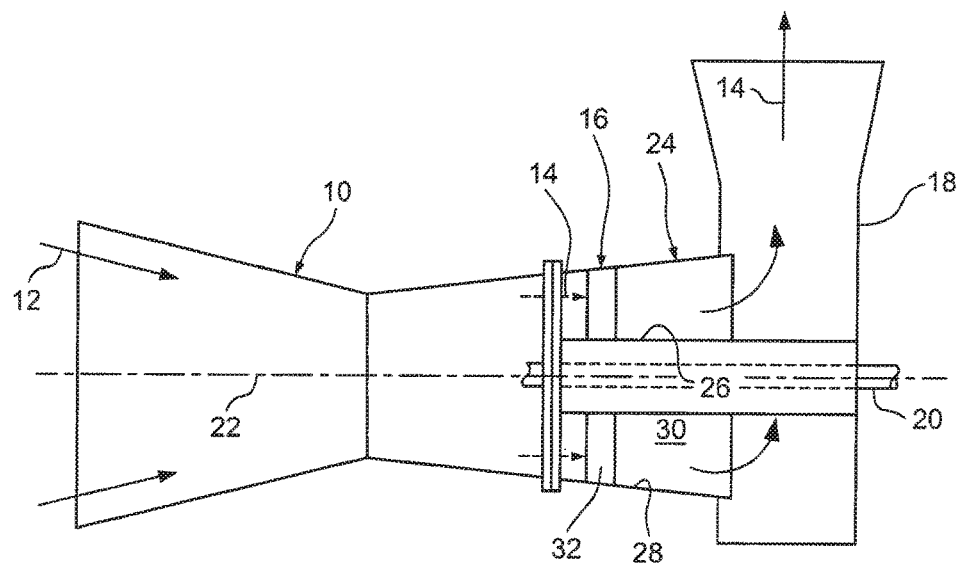
FIG. 1 is a schematic diagram of a gas turbine engine showing a compressor, a combustor, a turbine, and a diffuser.

Illustrated schematically in FIG. 1 is an exemplary industrial gas turbine engine 10, which is configured for receiving ambient air 12 and discharging exhaust or combustion gases 14 into an annular diffuser 16 in conventional fashion. The combustion gases are then discharged to atmosphere through a conventional exhaust assembly or stack 18.

Typically, the engine 10 may be a single or dual rotor engine, with one or more compressors and a combustor (not shown) in which compressed air is mixed with fuel and ignited for generating the combustion or exhaust gases 14. Disposed downstream of the combustor(s) are one or more turbine stages (not shown) which extract energy from the exhaust gases 14 for powering the engine 10 as well as for providing output power through an output shaft 20. The engine 10 and the diffuser 16 are typically axis-symmetrical about a centerline axis 22 which coincides with the turbine rotor/shaft 20.

The diffuser 16 illustrated in FIG. 1 includes at its upstream end an annular diffuser frame 24 having an annular center body or hub 26 spaced radially inwardly from an annular outer wall or casing 28, thus establishing an annular exhaust gas flow channel 30.

The center body or hub 26 (also referred to as the hub wall 26) and the outer wall 28 are substantially-cylindrical bodies, and it will be understood that the outer wall or casing 28 may taper along its length, typically outwardly in the direction of exhaust gas flow.

Figure 2:
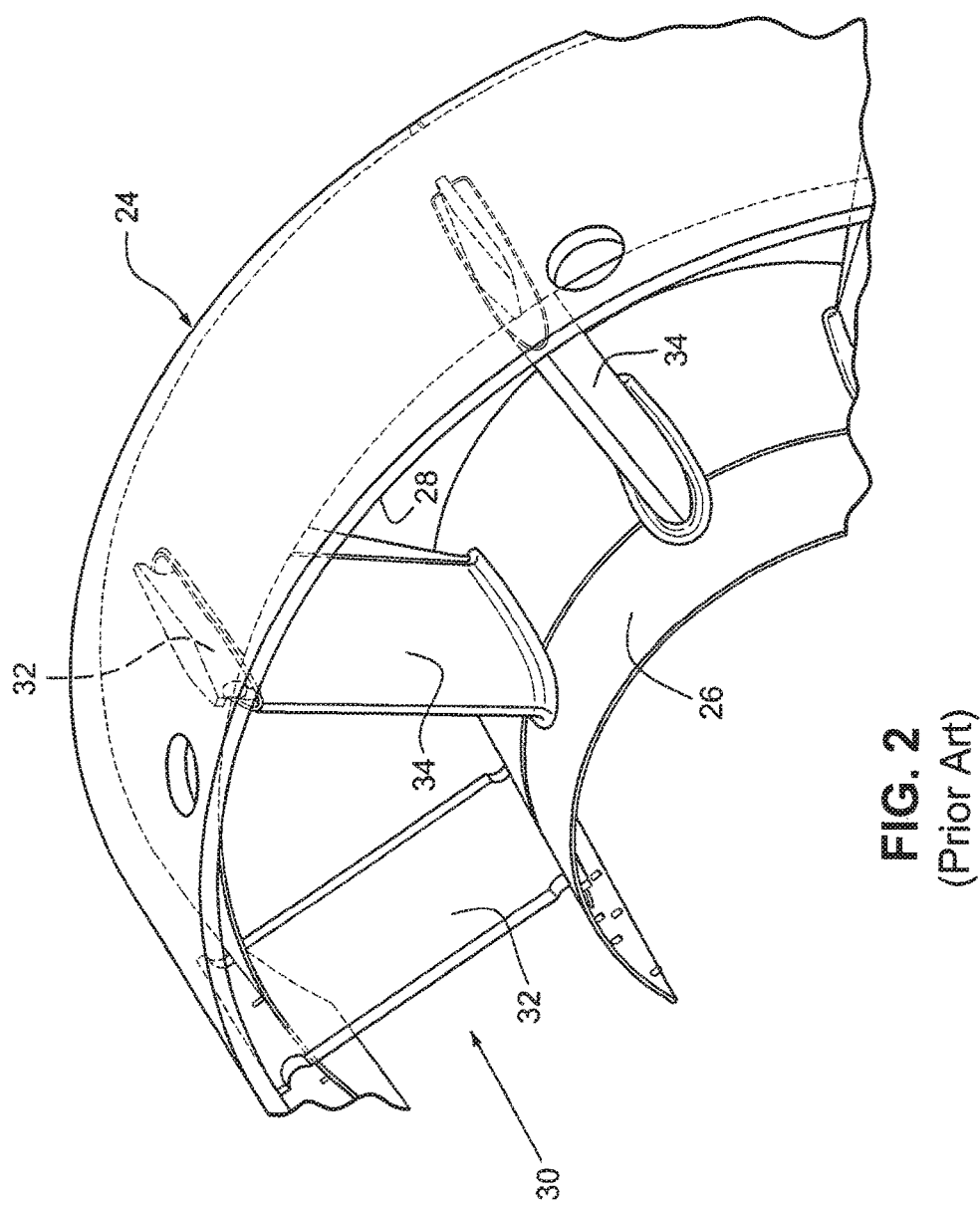
FIG. 2 is a partial perspective view of a portion of a known diffuser configuration.

FIG. 2 enlarges the diffuser frame 24 so as to show a single circumferential row of strut/airfoil assemblies extending between the inner wall or hub 26 and the outer wall or casing 28.

Typically, the strut or airfoil assembly is constructed in two pieces including an internal structural main strut 32 and an external airfoil 34 wrapped about the internal strut. The external airfoil 34 may form a sheath for the structural main strut 32. The internal struts are typically constructed of a material that is not rated for the high temperatures of the combustion gases flowing through the diffuser. The airfoil 34 is designed to withstand such temperatures and provide a thermal barrier protecting the struts 32. For convenience, the main strut/airfoil assemblies will be referred to, simply, as the main struts 32.

Figure 3:
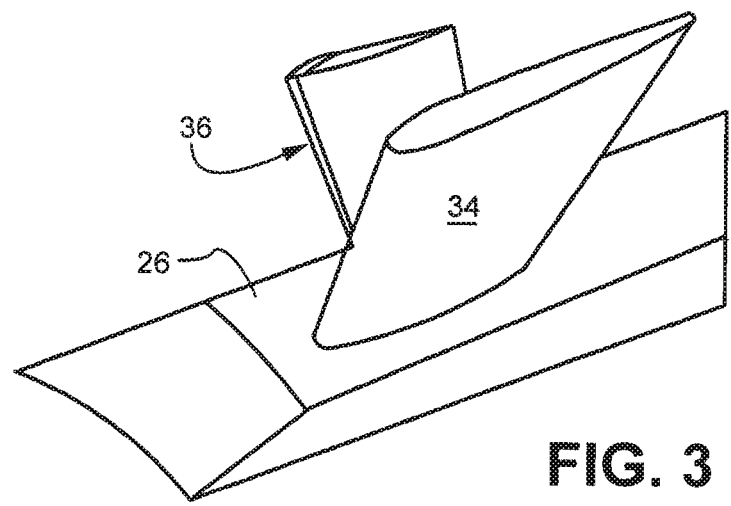
FIG. 3 is a partial perspective view of another known diffuser configuration.

As shown in FIG. 3, a number of smaller struts 36 may extend from the hub 26 and to the outer wall 28 of the diffuser casing. In this example, each smaller strut 36 is positioned adjacent a corresponding one of the main struts 34. The arrangements of smaller strut and main strut 36 are positioned symmetrically about the circumference of the hub. The angle, length, size, shape, and configuration of the smaller struts 36 may vary, but typically, the smaller strut is arranged at an angle (from about 5 to about 15 degrees) relative to the main strut centerline. Stated otherwise, the chord lines extending between the leading and trailing edges of the main struts 34 and smaller or auxiliary struts 36 are not parallel.

The use of the smaller struts 36 is intended to counteract correct swirl and to reduce flow separation about the main struts 34 and the hub 26 of the diffuser during part-load operating conditions. Nevertheless, it has been determined that use of the smaller struts 36 in association with the main struts 34 does not fully correct the problems of swirl and flow separation at the diffuser hub.

Figure 4:
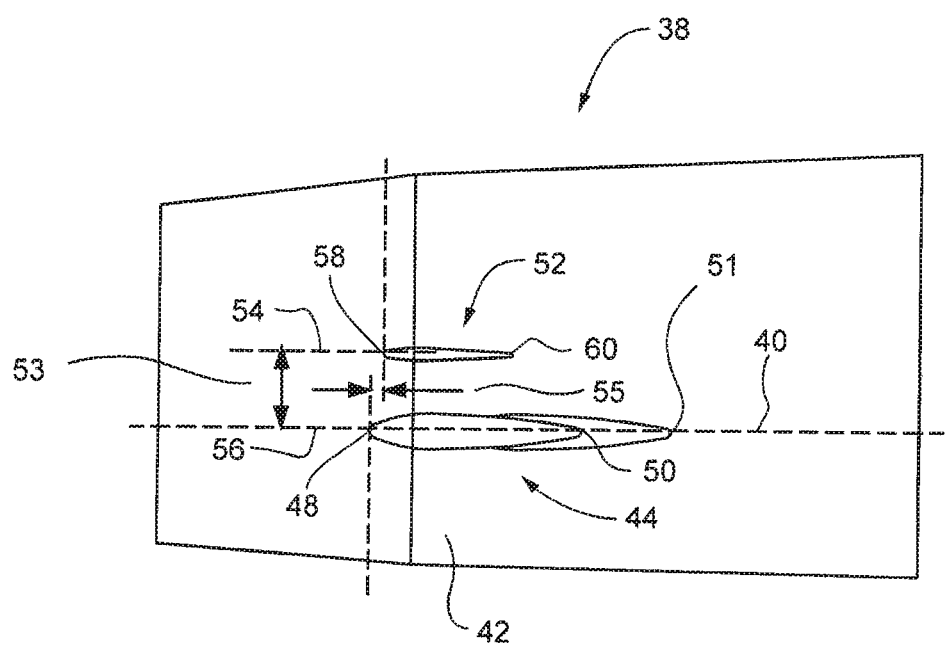
FIG. 4 is a schematic, cut-away top view of a portion of a diffuser in accordance with an exemplary but nonlimiting embodiment of the invention.
Figure 5:
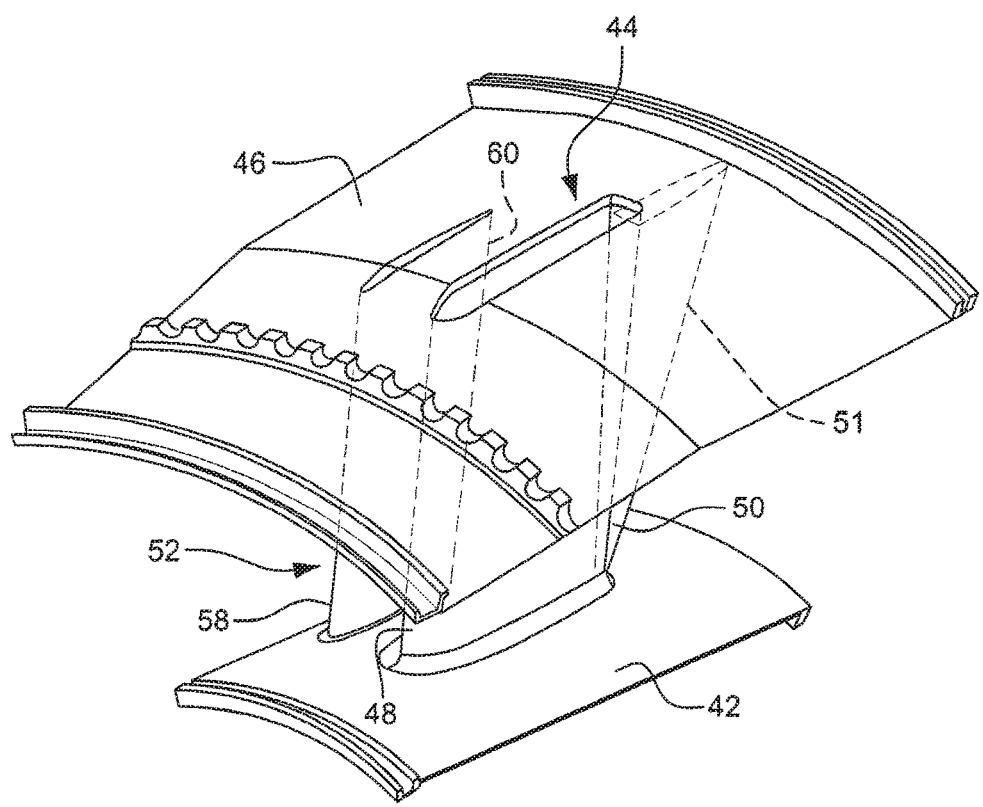
FIG. 5 is a partial perspective view of a diffuser configuration in accordance with an exemplary but nonlimiting embodiment of the invention.
Figure 6:
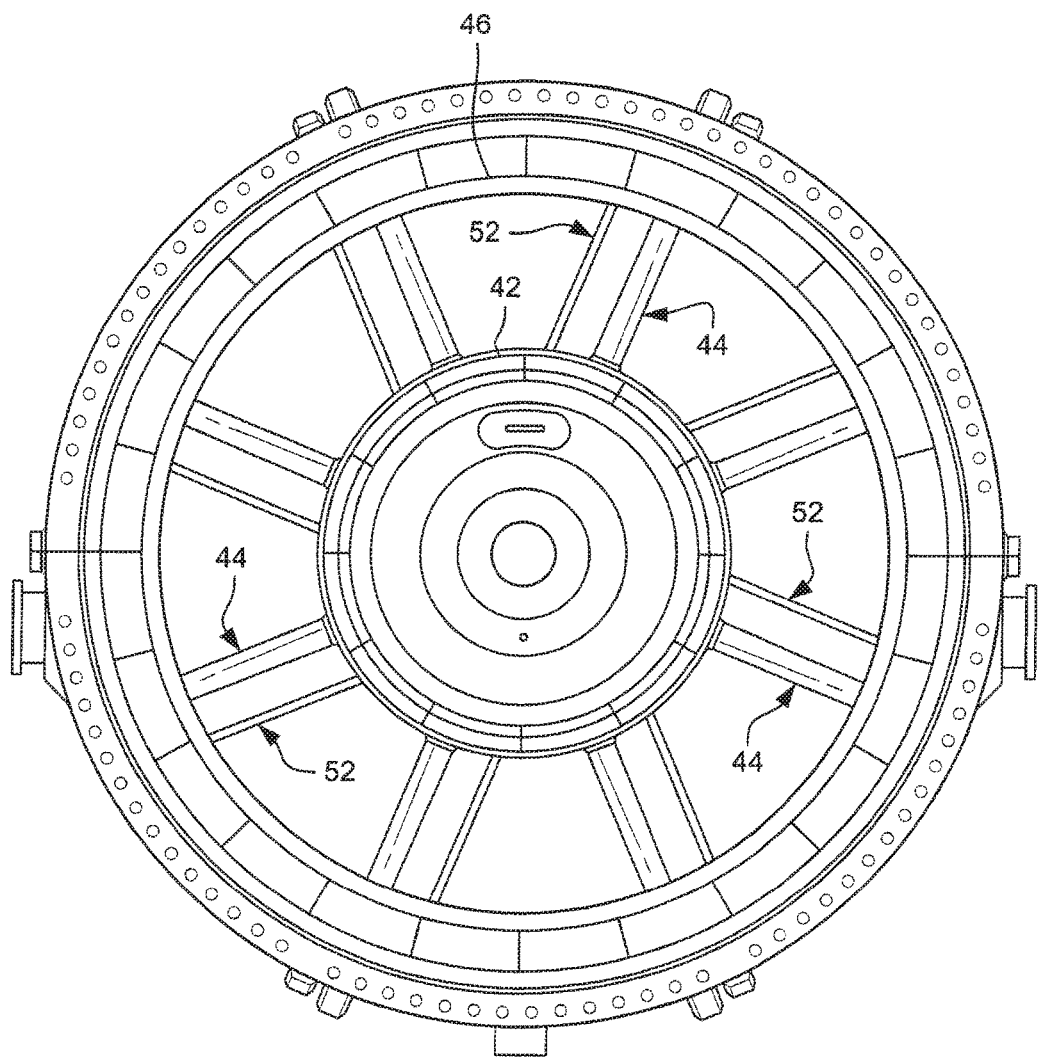
FIG. 6 is an end view of a diffuser incorporating the strut configuration shown in FIG. 5.

With reference to FIGS. 4-6, an exhaust duct or diffuser 38 is arranged to align substantially concentrically with the rotor axis, as represented by the center axis 40 of the diffuser. The hub 42 of the exhaust duct or diffuser 38 is also coaxial with the center axis 40 and supports a plurality of circumferentially-spaced, main struts 44 extending between the hub and the outer casing 46. The main struts extend radially from the center axis. The main struts 44 may be formed as aerodynamically-shaped, symmetrical vanes or as airfoils, with or without an optional trailing section 46. In the exemplary embodiment, the main struts 44 have leading edges 48 and trailing edges 50 such that a chord line extending from the leading edge to the trailing edge is parallel to the diffuser center axis 40. The number of main struts 44 may vary from, for example, six to eight or more. Alternatively, the trailing edge 51 may be oblique to a radial line such that the edge near the hub 42 is upstream of the edge near the outer casing 46.

In the exemplary but nonlimiting embodiment, smaller struts (also referred to as "auxifoils") 52 are located circumferentially between the main struts 44. The auxifoils may be symmetrically shaped in cross section about a center axis, or may be airfoil-shaped, with a chord line extending between leading and trailing edges of the auxifoil.

Each auxifoil is proximate to and associated with a main strut 44. As best seen in FIG. 6, the auxifoils 52 are located closer to the suction side of one of the two adjacent main struts 44 (see the strut 44 to the right of a respective auxifoil 52, as viewed in FIG. 6). For a diffuser as described herein, the suction and pressure sides of the main struts may vary with conditions, e.g., the same side may act as a pressure side at its design point or on a cold day, but as a suction side under part-load conditions due to the swirl angle from the last stage buckets.

In one example (see FIG. 4), the centerline axis or chord line 54 of the auxifoil is spaced 53 from the closest main strut centerline axis or chord line 56 in a range of about 4 and 10 inches. The spacing 53 between the main strut and the auxifoil may vary depending on the size of the diffuser, the number of main struts and manufacturing considerations, e.g., space requirements for welding. More specifically, the auxifoils may be positioned so as to maintain a substantially-uniform gap from hub to casing, but also with enough space to enable welding of the main struts and auxifoils. If the auxifoil is too close to the main strut, the arrangement becomes impractical (due to manufacturing problems); but if the auxifoil is located too far from the main strut, then the positive impact on reduction/elimination of main strut separation will be lost.

In the illustrated example, the leading edge 48 of the main strut is a distance 55 along the axis 40 offset from the leading edge 58 of the auxifoil 52. The distance 55 may be ahead, i.e., upstream relative to the flow direction, of the leading edge 58 by ten to twenty percent of the radial distance 53 between the chord of the main strut and the chord of the auxifoil. It will be appreciated that in other embodiments the distance 55 may be such that the leading edge is ahead or behind the leading edge of the auxifoil in a range, for example, of about ten percent to fifty percent of the distance 53.

The auxifoil 52 is symmetrically and aerodynamically shaped such that its center axis or chord line 54 extending between the leading edge 58 and the trailing edge 60 is parallel to both the main strut chord line or axis 56 and the diffuser center axis 40. The auxifoils be non-symmetrically shaped provided that they achieve desired flow characteristics, such as reduced swirl or reduced flow separation of the exhaust gas flowing over the main strut.

It will also be appreciated that while the main struts and auxifoils have been shown to be oriented substantially perpendicularly to the diffuser axis, it is within the scope of the invention to have the main struts and auxifoils slanted in a downstream direction from hub to outer casing. The degree of slant may vary from about 14 to about 20 degrees. In one example, the degree of slant may be about 17 degrees. There are stiffness and spatial benefits to be gained by this configuration with little or no impact on the flow separation solution provided by this disclosure.

In summary, it has been found that having the chord lines of the main struts and auxifoils parallel to each other and to the diffuser center axis provides the desired improved part-load performance while avoiding penalties at Full Speed-Full Load (FSFL).

Figure 7:
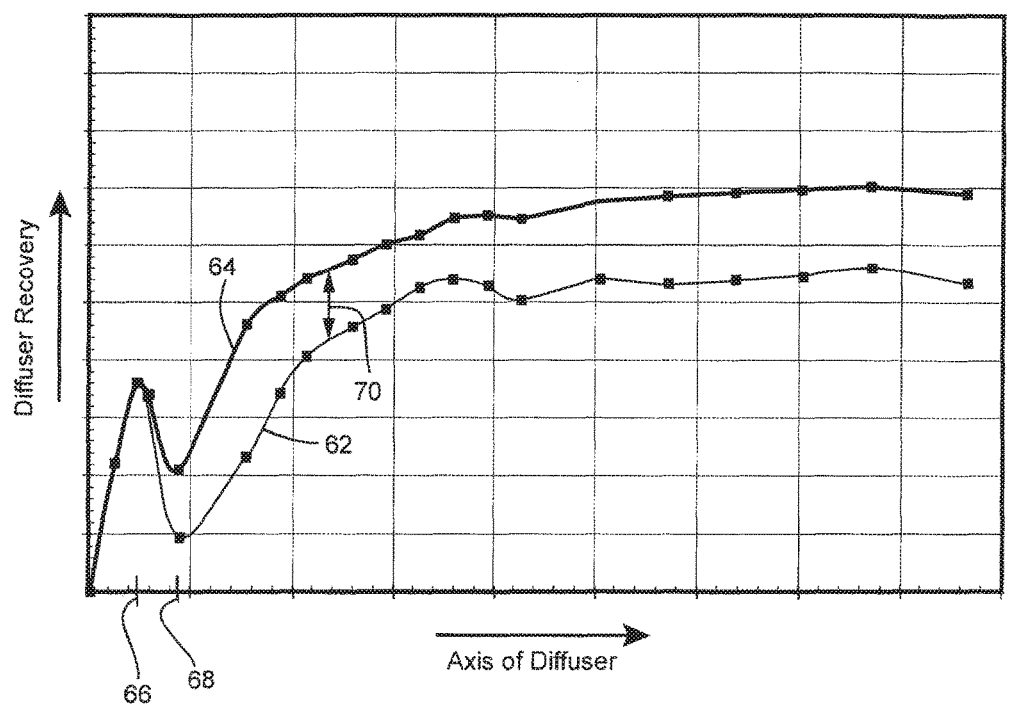
FIG. 7 is a plot of recovery of static pressure along an axis of the diffuser for a diffuser with and without auxifoils.

FIG. 7 is a plot of diffuser recovery as the exhaust flows along the axis of the diffuser. The diffuser recovery may represent an increase in static pressure of the exhaust flow. The lower trace 62 of diffuser recovery represents a diffuser with main struts and without auxifoils or smaller struts. The upper trace 64 represents a diffuser having main struts and auxifoils. The traces 62, 64 increase rapidly in the initial section of the diffuser and until the exhaust gas reaches the main struts at point 66. A large loss in diffuser recovery is shown in trace 62 as the exhaust gas flows from the leading edge (point 66) to the trailing edge (point 68) of the main strut. In contrast, the loss in diffuser recovery is substantially less, for example about forty percent less, for the trace 66 of a diffuser having auxifoils and main struts. The difference 70 in diffuser recovery persists as the exhaust gas passes through the diffuser.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An exhaust gas diffuser comprising:
    a radially-outer peripheral casing;
    a hub located within said radially-outer peripheral casing and coaxial with a center axis of the casing;
    main struts located at circumferentially-spaced locations about said hub and each extending radially-outwardly along a respective main strut axis to said radially outer peripheral casing; and
    small struts located at circumferentially-spaced locations between said main struts, wherein said main struts and said small struts have parallel longitudinal chord lines, and each of the small struts have a cross-sectional area smaller than a cross-sectional area of at least one of the main struts,
    wherein the small struts are adjacent the main struts along a circumferential direction perpendicular to the center axis, and
    wherein the small struts each have a small strut axis extending from the hub to the casing, and the small strut axis for each small strut is parallel to one of the main strut axis of the main strut nearest the small strut.

2. The exhaust gas diffuser of claim 1 wherein at least said small struts have aerodynamic shapes.

3. The exhaust gas diffuser of claim 1 wherein said main struts and said small struts have leading edges, and the leading edges of the main struts and the leading edges of the small struts are aligned with respect to the circumferential direction perpendicular to the center axis.

4. The exhaust gas diffuser of claim 1 wherein leading edges of said main struts are circumferentially offset from leading edges of the small struts.

5. The exhaust gas diffuser of claim 4 wherein said leading edges of said main struts are axially offset from said leading edges of said small struts.

6. The exhaust gas diffuser of claim 1 wherein said small struts each have a leading edge and a trailing edge, and wherein, for each of the small struts, the chord line of the small strut extends between said leading and trailing edges of the small strut and the chord line is parallel to the chord line of an adjacent one of said main struts and to the center axis of the diffuser.

7. The exhaust gas diffuser of claim 1 wherein each of said small struts is between a pair of the main struts and is closer to a suction side of a first main strut of the pair of adjacent main struts as compared to a second main strut of the pair of adjacent main struts, wherein the suction side is determined while the gas diffuser is operating under part-load conditions.

8. The exhaust gas diffuser of claim 7 wherein a circumferential distance between each of said small struts and the closer of two adjacent of the main struts, as measured from respective center axes of the small and large struts, is between four and ten inches, wherein the circumferential distance measured is at the hub.

9. The exhaust gas diffuser of claim 1 wherein a circumferential space between each of said small struts and a closer of two adjacent of the main struts on opposite sides of the small strut, as measured from respective center axes of the struts, does not exceed ten inches.

10. The exhaust duct of claim 1 wherein each of the axes of the small struts is oblique to a radial line extending from the center axis through the axis of the small struts.

11. An exhaust gas diffuser comprising:
    an outer casing;
    a hub centered within said outer casing and having a centerline;
    airfoil-shaped main struts extending from said hub to said outer casing in a circumferentially-spaced array, said main struts each having an axis coaxial with a radial line from the centerline of the hub; and
    auxifoils located circumferentially between adjacent pairs of said main struts, each of the auxifoils have a cross-sectional area smaller than a cross-sectional area of one of the main struts,
    wherein a distance separating each of the auxifoils and the main strut nearest to the auxifoil is constant distance from the hub to the outer casing, and
    wherein each of the auxifoils has a chord line between a leading and trailing edge of the auxifoil is parallel to a chord extending between a leading edge and a trailing edge of the main strut nearest to the auxifoil.

12. The exhaust gas diffuser of claim 11 wherein said auxifoils have smaller length and width dimensions than the nearest main strut.

13. The exhaust gas diffuser of claim 11 wherein a circumferential distance between each of said auxifoils and the nearest main strut is in a range of two to ten inches, wherein the circumferential distance measured is at the hub.

14. The exhaust gas diffuser of claim 11 wherein said auxifoils are symmetrically shaped.

15. The exhaust gas diffuser of claim 11 wherein said main struts and said auxifoils have leading edges, wherein the leading edges of the main struts and the leading edges of the auxifoils are aligned along a direction perpendicular to the centerline of the hub.

16. The exhaust gas diffuser of claim 11 wherein the leading edges of said main struts are offset along the axis of the hub from leading edges of the auxifoils.

17. The exhaust gas diffuser of claim 16 wherein said leading edges of the main struts extend axially beyond said leading edges of the auxifoils in an upstream direction relative to flow through said exhaust gas diffuser.

18. An industrial gas turbine comprising:
    a compressor,
    a combustor,
    one or more turbine stages, and
    an exhaust duct arranged along a turbine rotor axis, said exhaust duct incorporating a diffuser having a radially-outer peripheral casing;
    a center body or hub located within said radially outer peripheral casing;

main struts located at circumferentially-spaced locations about said center body or hub and extending radially-outwardly to an outer peripheral casing; and small struts located at circumferentially-spaced locations between said main struts along a circumferential direction perpendicular to an axis of the center body or hub, wherein a gap separating each of the small strut from a nearest main strut is constant from the center body or hub to the radially-outer peripheral casing, wherein each of the small struts have a cross-sectional area smaller than a cross-sectional area of at least one of the main struts, said main struts and the smaller struts have chord lines parallel to the axis of the center body or hub, and wherein a circumferential distance between each of said small struts and a nearest one of the main struts along the direction perpendicular to the axis does not exceed ten inches, wherein the circumferential distance is measured at the center body or the hub.

19. The industrial gas turbine of claim 18 wherein said main struts and said small struts have leading edges, and the leading edges of the main struts and the leading edges of the small struts intersect a plane perpendicular to the turbine rotor axis.

20. The industrial gas turbine of claim 18 wherein leading edges of said main struts are offset from leading edges of the small struts, wherein the offset is parallel to the turbine rotor axis.

21. The industrial gas turbine of claim 20 wherein the offset is in a range of about ten to twenty percent of the circumferential distance.

\* \* \* \* \*

UNITED STATES PATENT AND TRADEMARK OFFICE
CERTIFICATE OF CORRECTION

PATENT NO. : 10,392,975 B2
APPLICATION NO. : 15/127355
DATED : August 27, 2019
INVENTOR(S) : Deepesh D. Nanda et al.

Page 1 of 1

It is certified that error appears in the above-identified patent and that said Letters Patent is hereby corrected as shown below:

In the Claims

Claim 21, Column 7, Line 30, change "about ten to twenty" to --ten to twenty--

Signed and Sealed this
Twenty-second Day of October, 2019

Andrei Iancu
*Director of the United States Patent and Trademark Office*